United States Patent [19]

Mayfield

[11] Patent Number: 4,548,493
[45] Date of Patent: Oct. 22, 1985

[54] MASK TRANSFERENCE AND ALIGNMENT APPARATUS

[76] Inventor: William C. Mayfield, 4945 Alhama Dr., Woodland Hills, Calif. 91364

[21] Appl. No.: 598,815

[22] Filed: Apr. 10, 1984

[51] Int. Cl.[4] ............................................. G03B 27/28
[52] U.S. Cl. ..................................... 355/125; 355/132
[58] Field of Search .................... 355/125, 132, 79, 80, 355/93, 91, 85–87, 18, 73, 133

[56] References Cited

U.S. PATENT DOCUMENTS

| | | | |
|---|---|---|---|
| 3,597,081 | 8/1971 | Cason et al. | 355/76 X |
| 3,619,056 | 11/1971 | Hantusch et al. | 355/87 X |
| 4,322,161 | 3/1982 | Mohr | 355/93 |

*Primary Examiner*—L. T. Hix
*Assistant Examiner*—Della J. Rutledge
*Attorney, Agent, or Firm*—Roger A. Marrs

[57] ABSTRACT

A film mask handling device is disclosed herein having a base supporting a positive image slide in a mount or frame and a film mask carrying a negative image thereof in close fixed spaced apart relationship. Adhesive strips are carried on a pivotal and laterally movable yoke that initially aligns with and picks up the film mask for subsequent indexing with and attachment to the mount or frame via the adhesive strips so that the negative image on the mask is in registry with the positive image on the slide. A vacuum system is operably provided in the base for releasably holding the film mask and adhesive strips in relative positions during alignment and registry procedures. Controls are provided for sequentially releasing and picking up of the mask and strips respectively during the aforementioned procedures.

11 Claims, 7 Drawing Figures

MASK TRANSFERENCE AND ALIGNMENT APPARATUS

BACKGROUND OF THE INVENTION

1. Field of the Invention

The present invention relates to automatic masking techniques and apparatus and, more particularly, to a novel film mask handling device for releasably holding and moving a negative image mask and a pair of adhesive strips with respect to each other and with respect to a frame mounted positive image slide whereby assembly of the mask to the mount of the slide by the adhesive strips is in proper alignment of the positive and negative images.

2. Brief Description of the Prior Art

In the past, photographic prints displaying high contrast and resolution characteristics have been difficult to obtain due to the difficulty in matching large areas of different density with the reproduction potential of selected print paper. In some instances, the difficulties have been largely overcome by using a negative image mask which is placed in close proximity and registry with the positive image of a 35 mm slide which is then processed through a film printer and contrast control mask. Such a procedure has been found to be extremely expensive and the resultant prints are available only to expensive commercial projects and wealthy print collectors.

Difficulties and problems have been encountered when placing the mask in a registered or indexed position with respect to the positive slide which stem largely from the fact that time is consumed in removing the cardboard or paper mount or frame from around the slide and then visually aligning the negative image mask with the positive image on the slide followed by temporary attachment of the mask to the slide. In this condition, the assemblage is difficult to handle and requires special procedures when introduced to the printer for exposure. Obviously, such tedious steps as removing the slide from the cardboard mount is time consuming, laborious and uneconomical.

Therefore, a long standing need has existed to provide a mask handling device or apparatus which eliminates the need for removing positive image slides from their mounts and which automatically registers negative image masks upon the mounted slide with required accuracy and precision which economically speeds the process of mask making and assembly many times faster than conventional methods.

SUMMARY OF THE INVENTION

Accordingly, the above problems and difficulties are obviated by the present invention which provides a novel means for assembling a negative image mask with a positive image slide mounted on a cardboard frame so that the images are in proper registry and releasably held together which comprises a film mask handling device having a base supporting the slide mounted positive image film in a fixed location and for mounting a negative image mask in fixed spaced apart relationship therewith. Movable means are included on the base for carrying adhesive strips adapted to be placed over the negative image mask in precise location and vacuum means are provided for releasably holding the mask on the base and for subsequent pickup and retention of the mask unto the strip holding means whereby the strip holding means is positionable over the positive image slide mount for deposit of the mask and adhesive strips thereon to complete the assemblage. A feature resides in providing vacuum means for releasably holding the mask onto the base and for releasably holding the strips onto the movable means so that the mask and strips may be transferred from one station or position to another over the positive image slide mount.

In one form of the invention, the movable means includes a yoke which is carried on an elongated slide for lateral movement between the mask and the mounted slide and which further includes pivot means for sequentially positioning the adhesive strips first in alignment with the mask and secondly, in alignment with the positive image slide mount. Control means are included for manually and automatically releasing and picking up the mask from the base and for positioning the yoke from one position to another as well as for effecting precision indexing and registering of the components with respect to one another prior to pressure engagement completing the assemblage.

Therefore, it is among the primary objects of the present invention to provide a novel component handling device whereby several components of an assemblage are manually and automatically manipulated into precision and registered positions with respect to one another prior to ultimate engagement and contract into a completed assemblage.

Another object of the present invention is to provide a novel component handling device capable of transferring and registering various components for assembling a mask with a slide mount utilizing adhesive fasteners which will produce high volumes of masked/slide prints without removing the slides from their mounts.

Still another object of the present invention is to provide a novel apparatus for handling various components of a mask/slide assemblage whereby significantly improved highlight and shadow detail is produced by an optical method employing the assemblage of separate components such as a negative image mask and a positive image slide without removing the slide component from a frame or mount.

Yet another object of the present invention is to provide a novel component handling apparatus for handling, transferring and registering components of a mask/slide assemblage wherein the componets are held in position by vacuum devices and release of the components from supporting bases is provided by controls coupled into the vacuum system.

Still a further object of the present invention is to provide a novel component handling device in a automated masking process employing vacuum control for holding the components and for transferring the components from one place to another with accurate registry and indexing respective to the component parts whereby an accurately assemblage of the component parts is produced.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENT

In the making of photographic prints, a masking process is used to produce high volumes of mask photographic prints such as is used in Cibachrome printing. Masking significantly improves highlight and shadow detail as it accurately varies the exposure upon different areas of the picture. Large areas of different density are reproduced at a relatively low macro-contrast to best match the reproduction potential of the paper such as Cibachrome paper. While lowering the macro-contrast, a high level of micro-contrast is retained to reproduce the fine details more clearly. The masks are negative image and are produced directly from the film such as a 35 mm slide by an optical method without removing slides from their mounts. After processing, the negative image masks are registered upon the mounted slide by the novel mask-handling and registering device of the present invention as indicated in the general direction of arrow 1.

Figure 1:
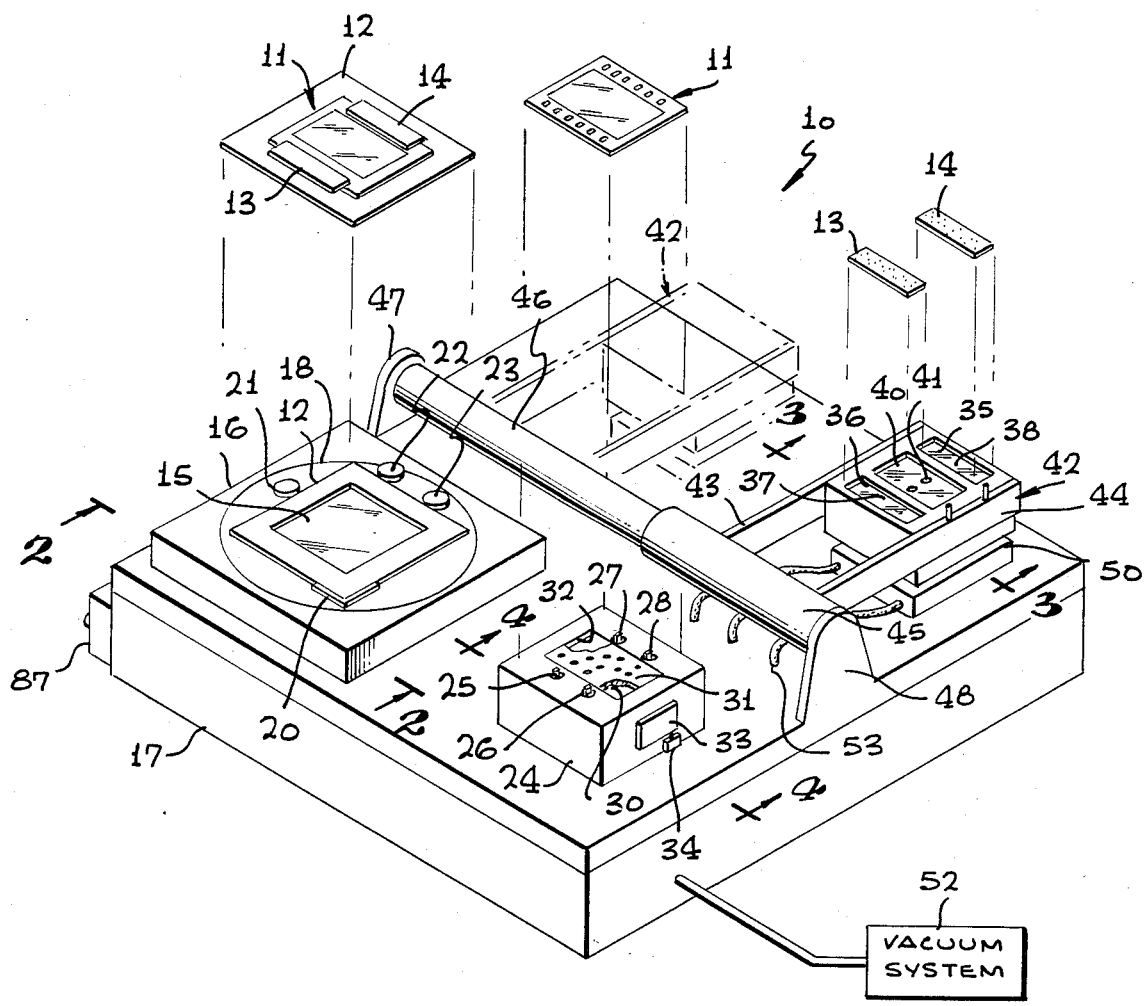
FIG. 1 is a perspective view of the novel component transferring and registering apparatus of the present invention incorporating the novel vacuum and control systems therefore.

Referring now to FIG. 1, the numeral 10 represents the novel component transferring and registering apparatus for producing a fully assembled product which takes the form of a photographic slide having a negative image mask releasably attached thereto. The mask is indicated by numeral 11 and is attached to the mount or frame 12 of a positive image slide by a pair of spaced apart adhesive strips 13 and 14 respectively. The mask 11 covers the positive image slide which is indicated by numeral 15 when exposed on a stage or platform 16 carried on a base 17. The mounted slide 15 is placed on a turntable 18 and is held in position by means of a bracket 20 and studs 21, 22 and 23 on opposite sides of the mount from the edge or side engaging the bracket 20.

The mask 11 is releasably carried on a stage or platform 24 carried on the base 17 in fixed spaced apart relationship with respect to the slide 15 which includes two pairs of indexing pins indentified by numerals 25, 26 and numerals 27 and 28 which are arranged in fixed spaced apart relationship on opposite sides of a central cavity 30 which is covered by a perforated plate 31 against which the under surface of the mask 11 rests. The cavity 30 is in communication with vacuum nozzles, such as nozzle 32, included in a vacuum system for releasably holding the mask 11 in critical position on the perforated plate 31. It is to be noted that the pins 25, 26 and 27, 28 are employed to extend through aligned apertures carried along the opposite edge marginal regions of the mask 11. The plurality of registry pins are movable in a vertical direction to selectively separate from the mask 11 when an actuator plate 33 is depressed. The plate 33 engages a microswitch 34 which ceases or terminates the drawing of a vacuum from the cavity 30 to release the mask 11 during the transference or handling cycle.

The component comprising the adhesive strips 13 and 14 are carried respectively within cavities 35 and 36 on movable platforms 37 and 38. Disposed between the cavities 35 and 36, there is provided a central cavity 40 which includes vacuum nozzles, such as nozzle 41, communicating with the overall vacuum system. Also, it is to be understood that vacuum nozzles are exposed through the platforms 37 and 38 respectively for effecting a vacuum sufficient to hold the strips 13 and 14 within their respective cavities until released. The central vacuum cavity 40 is employed to receive the mask 11 during the transference procedure when the mask is intended to be picked up from its mounting on platform 24. Therefore, the cavities and vacuum system as well as movable platforms 37 and 38 represent a strip holding and mask pickup device represented generally by the numeral 42. The device 42 is carried in a yoke structure comprising a pair of side elements 43 and 44 which are carried on opposite sides of the body 42 at one end and coupled to a sleeve 45 on its opposite end serving as a pivot about a rod 46 carried between mounting pieces 47 and 48. It is also to be noted that the sleeve 45 not only pivots on the rod 46 but may be slid laterally across the top of the base 17 from a position opposite the mask platform 24 to a position opposite the mounted slide platform 16.

Furthermore, a manifold or header plate 50 is carried on the end of rods projecting through the body 42 terminating in a fixed connection with the platforms 37 and 38. The manifod 50 is resiliently carried with respect to the body 42 by means of springs such as spring 51 carried about a post interconnecting the manifold with the platform. The respective vacuum nozzles carried on the platform and carried in the body adjacent the recess or cavity 40 are connected to a vacuum system indicated in general by numeral 52 via a plurality of conduits or hoses such as hose 53. It is to be understood that suitable ducting is provided within the body 40, the connecting rods between the manifold 50 and the platform and the central recess or cavity 40 so that the nozzles are suitbly and operably coupled to the vacuum system 52. This understanding is also carried to the platform or stage 24 which includes suitable conduits or ducting so that the nozzles are connected to the vacuum system 52.

Figure 2:
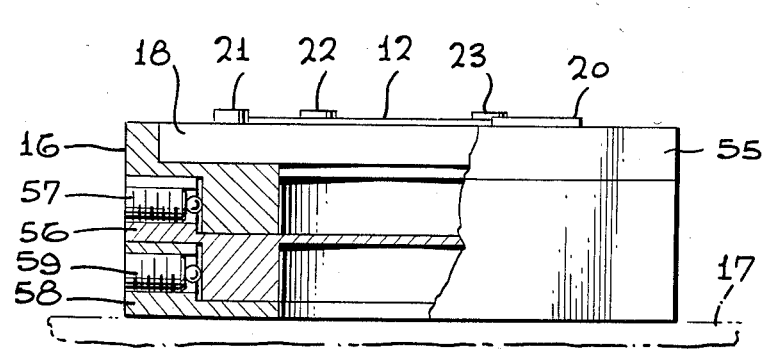
FIG. 2 is a cross-sectional view of the base support for a mounted slide as taken in the direction of arrows 2—2 in FIG. 1.

Referring now to FIG. 2, it can be seen that the mounted slide is carried on top of the platform 16 supported on base 17 and that the platform includes a turntable 18 which may be manually rotated in order to achieve proper orientation of the image on the slide to the specifications of the operator. Additional adjustments are provided by mounting the turntable 18 onto an upper section 55 that is carried on a mid section 56 for rectilinear movement along a given axis. A set screw 57 is rotably carried on a flange of mid section 56 and butts against the upper portion 55 so that upon rotation of the screw 57, the slide can be positioned along that particular axis. A similar arrangement is effected between a bottom portion 58 on which the intermediate or mid portion 56 is carried. A set screw 59 is used for positioning the mid section along another axis with respect to the bottom portion 58.

Figure 3:
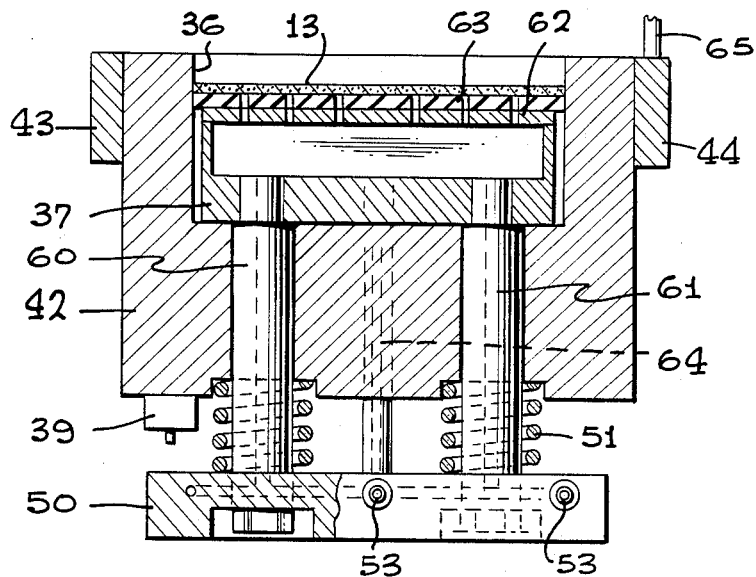
FIG. 3 is a transverse cross-sectional view of the adhesive strip carrying means as taken in the direction of arrows 3—3 of FIG. 1.

Referring now in detail to FIG. 3, the mask pickup and strip carrying means 42 is more clearly illustrated. Located within recess 36 on one end of the body is a movable platform 37. The platform is carried on the terminating end of posts 60 and 61 which move through bores created in the body 42. The opposite end of posts 60 and 61 are fixed to the manifold or header 50 and the biasing means, such as spring 51, are disposed between the opposing surfaces of the body 42 and the header 50 which forcibly urges the platform 37 against the bottom of the recess 36. A cavity is located within each of the platforms and the cavity is in fluid communication with the vacuum system via ducting through each of the respective posts 60 and 61 and ducting or passageways in the manifod 50. The ducting or passageways are shown in dotted lines with respect to the parts mentioned. Therefore, it can be seen that when the top of the cavity. in the platform is closed, a vacuum can be drawn in the cavity which will hold down items disposed within the upper portion of cavity 36. In this regard, a perforated plate 62 is immediately seated over the cavity in the platform 37 with a perforated gasket 63 carried thereon. The appertures in the respective plate 62 and gasket 63 are in alignment and are coexstensive. On top of the gasket, there is provided the adhesive strip 13 with the adhesive surface exposed and the smooth flat, nonadhesive surface resting against the gasket 63. Upon the pulling of a vacuum within the chamber or cavity of the platform 37, the strip 13 will be held against the gasket below the surface of the cavity 36 so that the pickup and strip carrying unit 42 may be moved from one station or position to another without contract with the adhesive surface or without dropping or losing hold of the respective strips.

The center cavity 40 including its respective vacuum nozzles are connected to the vacuum system via conduit or hose 53 and interconnecting ducts and passageways within the body 42 and manifold 50. A typical duct and nozzle 41 is indicated in dotted lines by the numeral 64.

It can also be seen that an actuating rod 65 is carried on the body 42 and yoke element or piece 44 that outwardly projects beyond the surface of the body terminating with the opening or entrance to the cavity 36. This actuating rod is employed for engaging and manually urging the plate 33 associated with the mask base or support 24 into an operative position.

Figure 4:
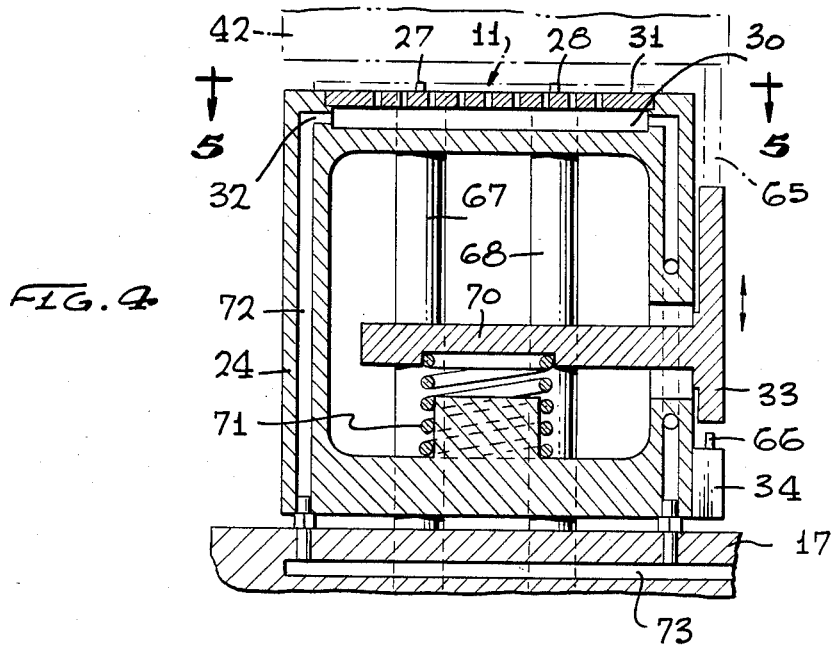
FIG. 4 is a transverse cross-sectional view of the negative image mask support base as taken in the direction of arrows 4—4 of FIG. 1.

Referring now in detail to FIG. 4, it can be seen that control rod 65 strikes against the plate 33 and urges the plate downward into contact with the actuator 66 of a microswitch 34. Also, plate 33 is coupled to the pairs of indexing pins 25, 26 and 27, 28 by means of sliding posts 67 and 68 via a connecting member 70. The member 70 is fixedly coupled to each of the posts midway between its opposite ends and the posts follow the movement of the plate 33 upward and downward. A spring 71 is compressed between the opposing surfaces of the member 70 and the bottom of the interior of body 24 so that the plate 33 and the registering pins or indexing pins 25, 26 and 27, 28 are normally exposed above the surface of the perforated plate 31. By exposing the pins, the holes or openings along the edge marginal regions on the opposite edges of the film mask 11 may be placed thereover so the mask is held in that particular location and orientation until released by the withdrawal of the pins through the separation plate 31. Such an event will take place upon transference of the mask to the pickup unit 42 in the performance sequence.

It can also be seen that a vacuum is drawn in a cavity in the body 24 immediately beneath the separation plate 31 by means of the nozzles, such as nozzle 32, which is connected to the vacuum system 52 via internal passageways and ducts. For example, passageway 72 connects nozzle 32 through the body 24 with a main passageway 73 immediately connected to the vacuum system 52. Therefore, when a mask 11 is placed over the pins on top of the separator plate 31, a vacuum can be drawn to hold the film in that position and that this position will be maintained even when the alignment or indexing pins have been withdrawn through the separation plate upon the actuation of plate 33 by actuator 65.

Figure 5:
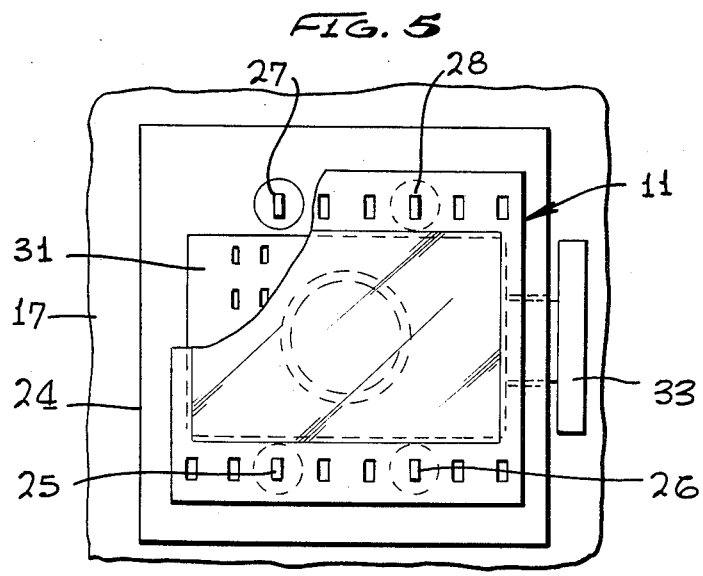
FIG. 5 is a top plan view of the mask support means shown in FIG. 4 as taken in the direction of arrows 5—5 thereof.

Referring now in detail to FIG. 5, it can be seen that the index pins 25, 26 and 27, 28 pass through registered openings in the edge marginal regions on the opposite sides of the mask.

Figure 6:
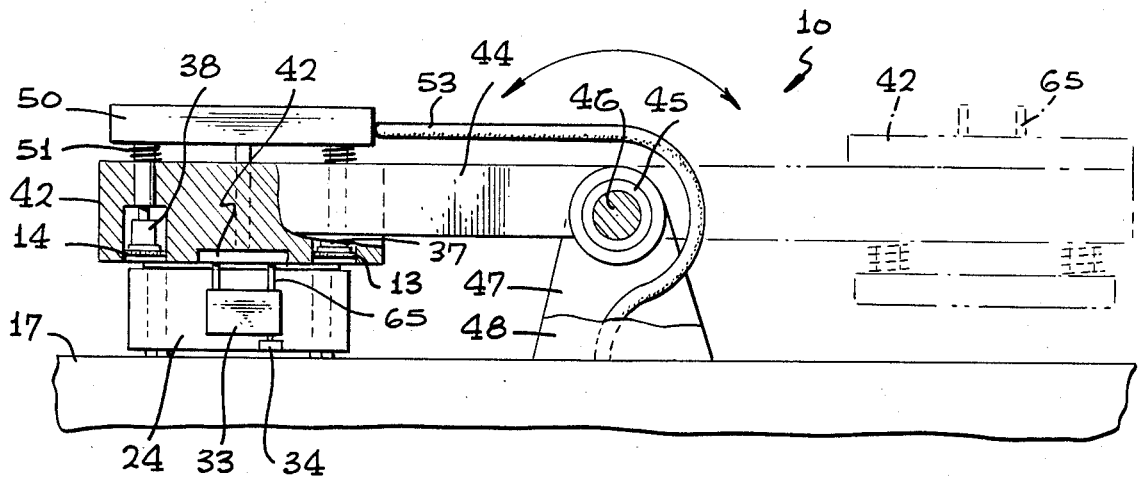
FIG. 6 is a side elevational view, partly in sections, of the adhesive strip support means and the mask support means illustrated in registry in solid lines preparatory for mask pickup.

Referring now to FIG. 6, the mask pickup and adhesive strip holding unit 42 is shown as being rotated from its dotted line position to the solid line position about shaft 46 via sleeve 45 and the yoke. When so rotated, the control rod 65 engages with the slide plate 33 which moves the plate downwardly against the expansion of spring 71 which, in turn, withdraws the index pins 25, 26 and 27, 28 from the holes along the edge marginal region of the mask. Simultaneously, the bottom of the plate 33 comes into contact with the actuator of the microswitch 34 that breaks the vacuum previously created within the chamber beneath the plate 31 so that the film mask 11 may be separated from and removed from its mounting on the platform or support 24. This is achieved by drawing a vacuum within the center chamber 40 of the body unit 42 so that the mask 11 may be carried thereby to another stage or work position on the apparatus. It is to be noted that in the condition shown in FIG. 6, the adhesive strips 13 and 14 are maintained deep within their respective recesses or cups due to the vacuum holding of these components and no adhesive contact takes place with the edges of the mask at this time. Means are provided for rotating the yoke and body unit 42 about the shaft 46 which may take the form of a manual displacement of the unit or it may be automatic by other machine and timing means. Furthermore, it is to be understood that the withdrawal of the registry or indexing pins may be achieved by other means than the rectilinear activation of the slide 33 such as by a rotary device which, when rotated, operates a cam bearing against plate 70 to convert the rotary motion into linear movement for withdrawing the pins against the tension of spring 71.

Figure 7:
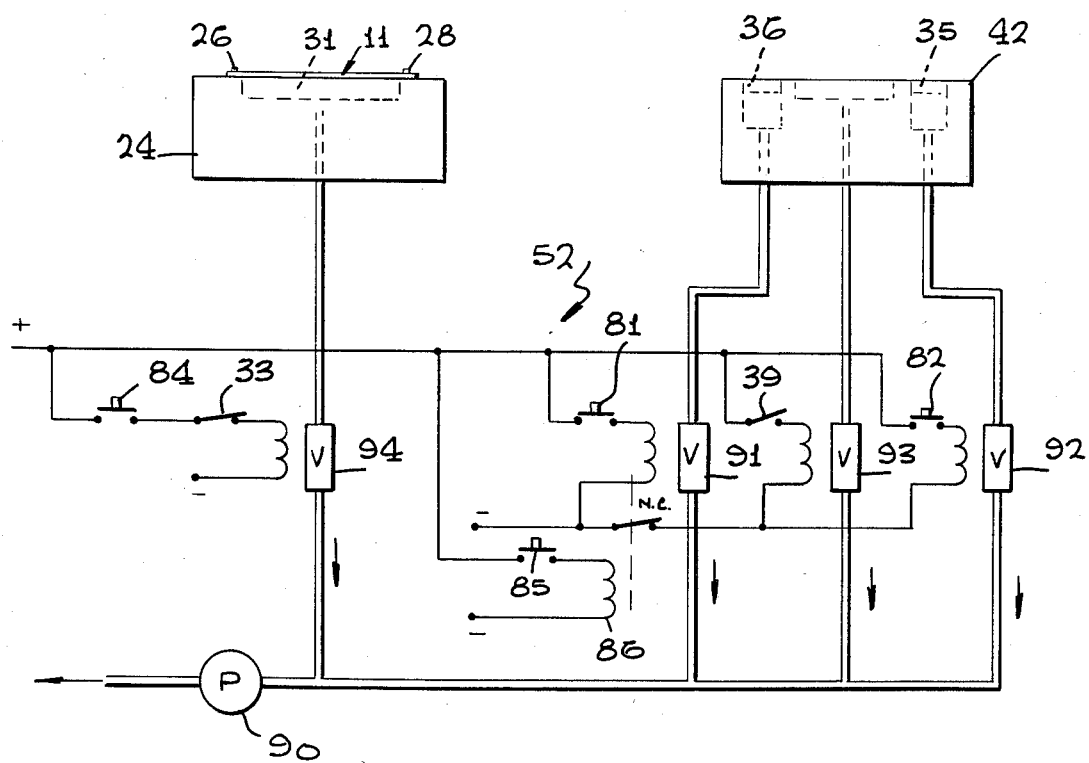
FIG. 7 is a schematic illustration showing the vacuum system and control network for performing the component holding and release functions associated with the apparatus of FIG. 1.

Referring now in detail to FIG. 7, the vacuum system 52 for the apparatus shown in FIGS. 1-6 inclusive, is illustrated including vacuum lines and electrical control lines.

Initially, a pump 90 is turned on and a vacuum gauge is checked for desired parameters. Next, the operator places an adhesive tab or strip in cavity 36 with the adhesive side exposed and vacuum button or switch 81 is actuated so that current is applied through a latching relay to a solenoid valve 91 drawing a vacuum in the cavity 36. The vacuum draws the non-adhesive side of the tab or strip against the platform 37 and the tab is held in this position by the vacuum drawn. Next, a second adhesive tab 14 is placed into the cavity 35 on top of platform 38 and vacuum button or switch 82 is depressed to energize the latching relay coil associated with a solenoid operated valve 92 which then causes a vacuum to be drawn in cavity 35 and the tab or strip 14 is held against the platform in the same manner as previously described with respect to tab or strip 13. Next, the mask 11 is manually placed over the register pins 25, 26 and 27, 28 on platform 24 and vacuum button or contract 84 is closed to energize a coil associated with solenoid valve 94 for drawing a vacuum in the cavity beneath plate 31 to hold the mask 11 in position thereagainst. It is to be noted that the contract of microswitch 33 is normally closed at this time and the mask 11 is firmly held in datum position. Next, a color slide in its mount is placed on the platform or stage 16 preparatory to receiving the mask 11. Next, the yoke holding the pickup and strips is swung or pivoted on rod 46 over base 17 and over platform 24. As the yoke is swung in an arc over to the pin registered mask 11, body 42 carrying rod 65 effects the retracting of the registry pins from the mask and microswitch 39 is closed to create a vacuum in cavity 40 which is now in registry with the mask 11. About a quarter of a second later, the actuator rod 65 opens microswitch 33 to cut off the vacuum in the chamber beneath mask 11 so that the mask is automatically transferred to the body 42. The mask is now securely held on the surface of body 42 which is then rotated clockwise on shaft 46 about 15 degrees and then manually moved laterally on linear bearing towards the platform 16 against fixed stop 47. The pickup and adhesive tab holder 42 is lowered until contact is made and pressure is exerted on the exposed surface of manifold 50 by either manual or automatic means. Downward pressure seals the adhesive tabs 13 and 14 along the edge marginal regions of the mask and the slide mount so that the images on the respective slide and mask are in alignment and registry. Additional pressure adjustably seals the components more fully. To deenergize the solenoid valve, a stop button 85 operates normally closed contact 86 which is in series with the coils of latching relays 91, 92 and 93. This action exhausts the vacuum in all of the cavities 35, 36 and 40 leaving the mounted slide with the registered mask in tact as an assembly via the adhesive strips 13 and 14.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A film mask transference and alignment apparatus comprising the combination of:
   a base;
   at least two fixed platforms carried on said base in fixed spaced apart relationship supporting a mounted slide and a film mask respectively;
   a pickup means movably carried on said base for separate and sequential registry with said platforms;
   said pickup means includes a pair of spaced adhesive strips releasably held in position to register with edge marginal regions of said film mask when in a first position immediately adjacent said fixed platform supporting said film mask and to register with edge marginal regions of said mounted slide when in a second position immediately adjacent said fixed platform supporting said mounted slide;
   vacuum means operably coupled to said film mask platform and said pickup means for releasably holding said film mask and said adhesive strips to their respective platforms and pickup means; and
   control means operably connected to said vacuum means for releasing said film msk from its platform and releasably securing said film mask on said pickup means in specific location with respect to said adhesive strips.

2. The invention as defined in claim 1 wherein:
   said vacuum and control means are interconnected for release of said adhesive strips and said film mask from said pickup means when said pickup means is in its second position; and
   pressure means applied to said pickup means forceably urging said adhesive strips to engage and secure said mounted slide and said film mask together in a registered and aligned relationship as a single unit.

3. The invention as defined in claim 2 wherein:
   said pickup means includes a body having a pair of strip holding cavities separated by a central mask holding cavities;
   movable platforms carried in said strip holding cavities for supporting each of said adhesive strips; and
   spring biasing means operably mounted between said platforms and said body for normally biasing said platforms and said strips into said cavities.

4. The invention as defined in claim 3 wherein:
   said film mask supporting platform includes a body having a vacuum cavity under said film mask and movable pin registering means engagable with said film mask for establishing a datum index or position with respect to said pickup means and said mounted slide platform.

5. The invention as defined in claim 4 including:
   means for mounting said pickup means on said base to rotate thereon in an arcuate path in said first position and for laterally slidable movement into said second position.

6. The invention as defined in claim 5 wherein:
   said mounting means includes a shaft slidably supporting a rotatable sleeve; and
   a yoke having one end secured to said sleeve and its opposite end secured to said pickup means.

7. An apparatus for combining separate components into a unitized assembly including a mounted slide having a positive image with a film mask having a negative image in registry with the positive image by adhesive strips along edge marginal regions of the mask and mounted slide, the improvement which comprises:
   a first platform supporting said film mask across a vacuum cavity;
   locating pins movably carried on said first platform retaining said film mask in a predetermined datum location;
   pickup means movably related to said first platform having a second platform provided with at least three cavities in adjacent side-by-side relationship;
   strip carriers or platforms movably mounted in a pair of said three vacuum cavities on opposite sides of a third cavity of said three for holding said adhesive strips;
   vacuum means operably coupled to said vacuum cavities for releasably retaining said film mask and said adhesive strips in fixed position; and control means operably included and connected between said first and second platforms for moving said first and second platforms for moving said locating pins from said film mask and for releasing said film mask from said first platform and for retaining said film mask on said second platform across said third cavity and for controllably releasing said film mask and adhesive strips so as to engage with and secure with said mounted slide.

8. The invention as defined in claim 7 wherein:

said pickup means includes a manifold secured to said strip carriers or platforms so as to move as a unit with respect to said second platform; and spring means disposed between said manifold and said second platform normally biasing said strip carriers or platforms into their respective cavities.

9. The invention as defined in claim 8 including:

said first platform provided with a vacuum cavity between opposite pairs of said locating pins; and an aperture plate carried over said vacuum cavity for supporting said film mask.

10. The invention as defined in claim 9 including;

each of said strip carriers or platforms having an elongated cavity covered by a perforated plate and gasket assembly in registry for supporting one of said respective adhesive strips; and each of said strip carrier or platform cavities in communication with said manifold allowing a vacuum to be drawn therein for retaining said adhesive strips in place.

11. A method for producing a registered assembly comprising a mounted slide having a positive image with a film mask having a negative image joined along common edge marginal regions by a pair of adhesive strips comprising the steps of:

placing said mounted slide on a support;

registering said film mask on a second support in fixed spaced relationship to said placed mounted slide with movable locating pins;

placing said pair of adhesive strips on a third support movably related to said first and second supports so as to be aligned with outer edges of said film mask when indexed therewith and aligned with inner edges of said mounted slide when indexed therewith;

drawing a vacuum through said second and third supports to releasably hold said film mask and said adhesive strips in place;

moving said third support over said second support while simultaneously removing the locating pins and releasing the film mask by terminating vacuum;

drawing vacuum in said third support adjacent the film mask to hold said film mask thereagainst;

moving said third support with registered film mask and adhesive strips to a position adjacent to said mounted slide; and applying pressure to said third support forceably urging said adhesive strips into securement with said film mask and mounted slide edge marginal regions while simultaneously terminating vacuum to said third support for releasing said film mask and adhesive strips.

* * * * *